United States Patent
Chaiken et al.

(10) Patent No.: US 6,802,056 B1
(45) Date of Patent: Oct. 5, 2004

(54) TRANSLATION AND TRANSFORMATION OF HETEROGENEOUS PROGRAMS

(75) Inventors: Ronnie I. Chaiken, Woodinville, WA (US); Hon Keat W. Chan, Bellevue, WA (US); Andrew J. Edwards, Redmond, WA (US); Gregory A. Eigsti, Redmond, WA (US); David M. Gillies, Bellevue, WA (US); Bruce M. Kuramoto, Bellevue, WA (US); John A. Lefor, Bellevue, WA (US); Ken B. Pierce, Bellevue, WA (US); Amitabh Srivastava, Woodinville, WA (US); Hoi H. Vo, Bellevue, WA (US); Gideon A. Yuval, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/343,805

(22) Filed: Jun. 30, 1999

(51) Int. Cl.[7] .................................................. G06F 9/45
(52) U.S. Cl. ...................... 717/136; 717/137; 717/146; 717/147
(58) Field of Search .............................. 717/136–143, 717/146–158

(56) References Cited

U.S. PATENT DOCUMENTS 5,175,856 A * 12/1992 Van Dyke et al. ........... 717/151
5,339,435 A * 8/1994 Lubkin et al. ................ 717/121
5,500,947 A * 3/1996 Uhler et al. .................. 712/211

(List continued on next page.)

FOREIGN PATENT DOCUMENTS

| EP | 0501613 | * 9/1992 | ............. G06F/9/44 |
| EP | 0510616 | * 10/1992 | ............. G06F/9/45 |
| WO | WO91/20030 | * 12/1991 | ............. G06F/9/45 |

OTHER PUBLICATIONS

De Bosschere, K., et al., "Alto: A Link–Time Optimizer for the DEC Alpha.", *Technical Report TR–98–14*, (1996).

Goodwin, D.W., "Interprocedural Dataflow Analysis in an Executable Optimizer", *Proceedings on Sigplan'97 Conference on Programming Language Design and Implementation*, (1997).

(List continued on next page.)

*Primary Examiner*—Wei Y. Zhen
*Assistant Examiner*—Mary Steelman
(74) *Attorney, Agent, or Firm*—Merchant & Gould P.C.

(57) ABSTRACT

Each component binary in a heterogeneous program is translated from a platform-specific instruction set into a set of intermediate representation (IR) instructions that are platform-neutral. The IR instructions are grouped into IR code blocks, the IR code blocks into IR procedures, and the IR procedures into IR components to create an intermediate representation hierarchy for the program. An application program interface is provided that permits user access to the IR hierarchy for instrumentation, optimization, navigation, and manipulation of the IR hierarchy. The transformed IR hierarchy is then translated into platform-specific instructions and output as a modified binary. The user can designate a different platform for the output translation of a code block than the platform for which the code block was originally written. Prologue and epilog code is added to contiguous blocks that are translated into different architectures. The modified binary can be iterated through the translation and transformation process to produce multiple versions of the heterogeneous program.

11 Claims, 10 Drawing Sheets

U.S. PATENT DOCUMENTS

| | | | | | |
|---|---|---|---|---|---|
| 5,539,907 | A | * | 7/1996 | Srivastava et al. | 717/130 |
| 5,559,884 | A | | 9/1996 | Davidson et al. | 380/4 |
| 5,661,191 | A | | 8/1997 | Haraguchi et al. | 521/59 |
| 5,664,191 | A | | 9/1997 | Davidson et al. | 395/670 |
| 5,790,858 | A | | 8/1998 | Vogel | 395/704 |
| 5,966,539 | A | * | 10/1999 | Srivastava | 717/156 |
| 5,970,490 | A | * | 10/1999 | Morgenstern | 707/10 |
| 6,158,045 | A | * | 12/2000 | You | 717/124 |
| 6,289,505 | B1 | * | 9/2001 | Goebel | 717/153 |
| 6,298,391 | B1 | * | 10/2001 | Kennedy et al. | 719/328 |
| 6,345,311 | B1 | * | 2/2002 | Breslau et al. | 709/310 |

OTHER PUBLICATIONS

Hastings, R., et al., "Purify: Fast Detection of Memory Leaks and Access Errors", *Proceedings of Winter Usenix Conference,*, (Jan. 1992).

Larus, J., et al., "Rewriting Executable Files to Measure Profeam Behavior", *Software Practice and Experience, 24 (2)*, 197–218, (1994).

Larus, J.R., "EEL: Machine–Independent Executable Editing", *ACM Sigplan Notices, 30 (6)*, pp. 291–300, (Jun. 1995).

Lee, H., et al., "BIT: A Tool for Instrumenting Java Bytecodes", *Proceedings of the 1997 Usenix Symposium pn Internet Technologies and Systems*, (1997).

Romer, T., et al., "Instrumentation and Optimization of Win32/Intel Executables Using Etch", *Proceedings of the Usenix Windows NT Workshop*, (1997).

Srivastava, A., et al., "A Practical System for Intermodule Code Optimization at Link Time", *Journal of Programming Language, 1(1)*, 1–18, (1993).

Srivastava, A., et al., "Atom, A System for Buidling Customized Program Analysis Tools", *ACM Sigplan Notices, 29 (6)*, pp. 196–205, (Jun. 1994).

Wall, D.W., "Systems of Late Code Modification, in Code Genetatio–Concepts, Tools Technique", *Robert Giegrich and Susan L. Graham, eds*, 275–293, (1992).

* cited by examiner

TRANSLATION AND TRANSFORMATION OF HETEROGENEOUS PROGRAMS

RELATED APPLICATIONS

The present application is related to U.S. patent applications entitled "Instrumentation and Optimization Tools for Heterogeneous Programs" application Ser. No.: 09/343,298; "Cross Module Representation of Heterogeneous Programs" application Ser. No.: 09/343,287; "Application Program Interface for Transforming Heterogeneous Programs" application Ser. No. 09/343,276; and "Shared Library Optimization for Heterogeneous Programs" application Ser. No. 09/343,279. Each of the above applications were filed on the same day as the present application and assigned to the same assignee.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1998, Microsoft Corporation, All Rights Reserved.

FIELD OF THE INVENTION

This invention relates generally to programming tools, and more particularly to translating code between computer architectures.

BACKGROUND OF THE INVENTION

In a new programming paradigm, a program is now a collection of components. Each component publishes an interface without exposing its inner details. Thus, a component can internally exist in any form: Intel x86 binary, Intel IA-64 binary, Visual Basic (VB) byte codes, Java class files, or any Virtual Machine (VM) binary. A heterogeneous program consists of components in different forms. Heterogeneous programs already exist in some environments: in the Microsoft Windows 32-bit environment, a Visual Basic program is compiled into VB byte codes that can call native-compiled functions in a separate dynamic linked library. Similarly Java class files can call native functions. Intel's IA-64 architecture allows IA-64 code to co-exist with x86 code.

To understand the behavior of a heterogeneous program, all its components, regardless of their form, have to be instrumented and analyzed in the same framework, otherwise, only partial information will be collected. It is important to note that systems that have been ported to several architectures are not sufficient to handle heterogeneous programs. For example, a system for VB byte codes that has been ported to x86, cannot provide a complete execution time analysis of a heterogeneous program consisting of VB byte codes and native x86 because each system operates in isolation on its own input.

Further, a heterogeneous program may consist of heterogeneous components. A heterogeneous component is a single component consisting of routines in different instruction sets. As the interface is well defined, components internally can use any instruction set. Each instruction set has its own advantages such as execution time, portability, and size.

All previous systems have been designed for homogeneous programs: conventional programs consisting of components in the same form. Some systems have been targeted to different architectures, but cannot work with heterogeneous programs. None of these systems can generate a heterogeneous component.

A large number of systems have been developed to help analyze and optimize homogeneous programs. The creation of "Pixie" by MIPS Computers Systems, Inc. in 1986 started a class of basic block counting tools by inserting pre-determined sequence of instructions to record execution frequencies of basic blocks. "Epoxie" extended the technique by using relocations to eliminate dynamic translation overheads. David W. Wall. *Systems for late code modification*, in Code Generation—Concept, Tools Techniques, pp. 275–293, (Robert Giegrich and Susan L. Graham, eds, 1992). "QPT" further extended the technique by constructing spanning trees to reduce the number of basic blocks that are instrumented. James Larus and Thomas Ball, *Rewriting executable files to measure program behavior*, Software, Practice and Experience, vol. 24, no. 2, pp 197–218 (1994). "Purify" instruments memory references to detect out-of-bounds memory accesses and memory leaks. Reed Hastings and Bob Joyce, *Purify: Fast Detection of Memory Leaks and Access Errors*, Proceedings of Winter Usenix Conference, Jan. 1992.

"OM" allowed general transformations to be applied to a binary by converting the binary to an intermediate representation that can be easily manipulated. Amitabh Srivastava and David Wall, *A Practical System for Intermodule Code Optimization at Link Time*, Journal of Programming Language, 1(1):1–18 (1993). OM has been implemented on MIPS, DEC Alpha and Intel x86 architectures. "EEL" uses a similar technique and provides an editing library for Sun SPARC architectures. James R. Larus and Eric Schnarr, *EEL: Machine-Independent Executable Editing*, Proceedings of SIGPLAN' 95 Conference on Programming Language Design and Implementation (1995). "Alto" and "Spike" are optimizers for the DEC Alpha architectures. K. De Bosschere and S. Debray, *Alto: a Link-Time Optimizer for the DEC Alpha*. Technical Report TR-96-16, Computer Science Department, University of Arizona (1996). David W. Goodwin, *Interprocedural Dataflow Analysis in an Executable Optimizer*, Proceedings of SIGPLAN' 97 Conference on Programming Language Design and Implementation (1997).

"ATOM" extended OM by providing a flexible instrumentation interface for the DEC Alpha and Intel x86 systems. Amitabh Srivastava and Alan Eustace, *ATOM: A System for Building Customized Program Analysis Tools*, Proceedings of SIGPLAN' 94 Conference on Programming Language Design and Implementation (1994). However, ATOM does not allow modifications to a binary. "Etch" provided a similar system for x86 and "BIT" for Java byte codes. T. Romer, G. Voelker, D. Lee, A. Wolman, W. Wong, H. Levy, B. Chen, and B. Bershad, *Instrumentation and Optimization of Win32/Intel Executables Using Etch*, Proceedings of the USENIX Windows NT Workshop (1997). Han Lee and Benjamin Zorn, *BIT: A Tool for instrumenting Java bytecodes*. Proceedings of the 1997 USENIX Symposium on Internet Technologies and Systems (1997).

None of these systems work on heterogeneous programs. Some of them have been ported to multiple architecture but they provide only a partial view when applied to heterogeneous programs as each implementation operates on its input in isolation. Although OM builds a symbolic representation, the representation was primarily designed for applying arbitrary transformations and is not sufficient to handle heterogeneous programs. None of these systems can generate heterogeneous components. ATOM provides a flexible interface for instrumentation only.

Because optimizing whole programs is known to be advantageous, there is a need to represent a heterogeneous program and its heterogeneous components in a fashion that permits the behavior of the program to be evaluated across architectural boundaries and optimization to be performed on the entire program.

SUMMARY OF THE INVENTION

The above-mentioned shortcomings, disadvantages and problems are addressed by the present invention, which will be understood by reading and studying the following specification.

Each component binary in a heterogeneous program is translated from a platform-specific instruction set into a set of intermediate representation (IR) instructions that are platform-neutral. The IR instructions are grouped into IR code blocks, the IR code blocks into IR procedures, and the IR procedures into IR components to create an intermediate representation hierarchy for the program. An application program interface is provided that permits user access to the IR hierarchy for instrumentation, optimization, navigation, and manipulation of the IR hierarchy. The transformed IR hierarchy is then translated into platform-specific instructions and output as a modified binary. The user can designate a different platform for the output translation of a code block than the platform for which the code block was originally written. Prologue and epilog code is added to contiguous blocks that are translated into different architectures. The modified binary can be iterated through the translation and transformation process to produce multiple versions of the heterogeneous program.

The IR hierarchy provides a uniform abstract view of both homogeneous and heterogeneous components in a heterogeneous program, thus allowing a single architecture-independent transformation to work on all component types. Because the architecture specific details are removed in the IR hierarchy, the present invention enables whole program optimization across what were previously incompatible boundaries between components in a heterogeneous program. The user can also choose the level of granularity at which to optimize, including creating a heterogeneous component from a previously homogeneous one. The whole program optimization enabled and provided by the present invention permits a user to evaluate the interrelationship between the various components to determine if code should be moved across component boundaries. The ability to specify different architectures into which the IR code blocks will be translated allows critical code section to be implemented in an instruction set that provides the best execution time.

The present invention describes systems, clients, servers, methods, and computer-readable media of varying scope. In addition to the aspects and advantages of the present invention described in this summary, further aspects and advantages of the invention will become apparent by referencing the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods and data structures for an exemplary embodiment of the invention are provided. In the third section, an exemplary embodiment of an IR instruction is described. Finally, in the fifth section, a conclusion of the detailed description is provided.

Hardware and Operating Environment

Figure 1:
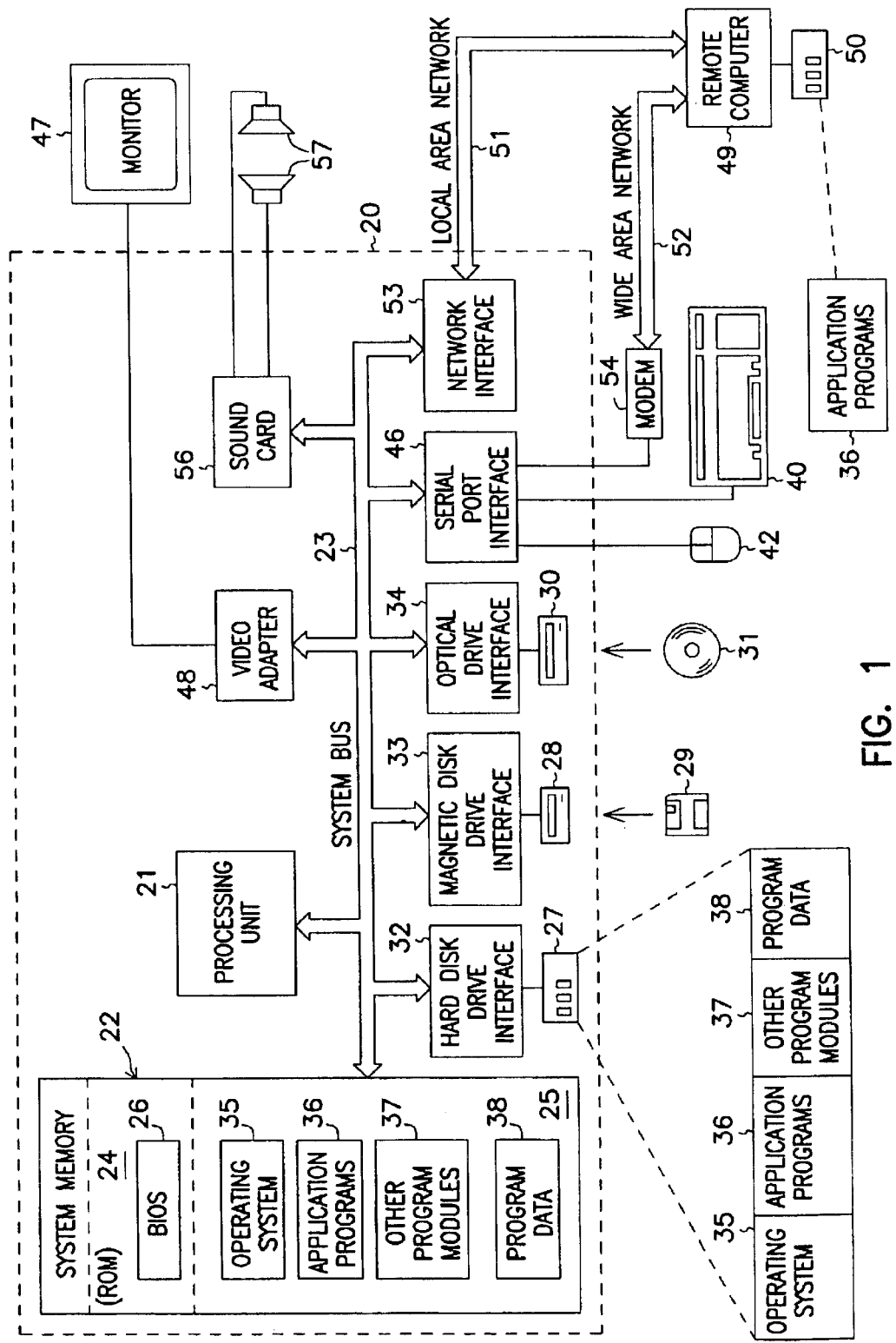
FIG. 1 is a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

Figure 2A:
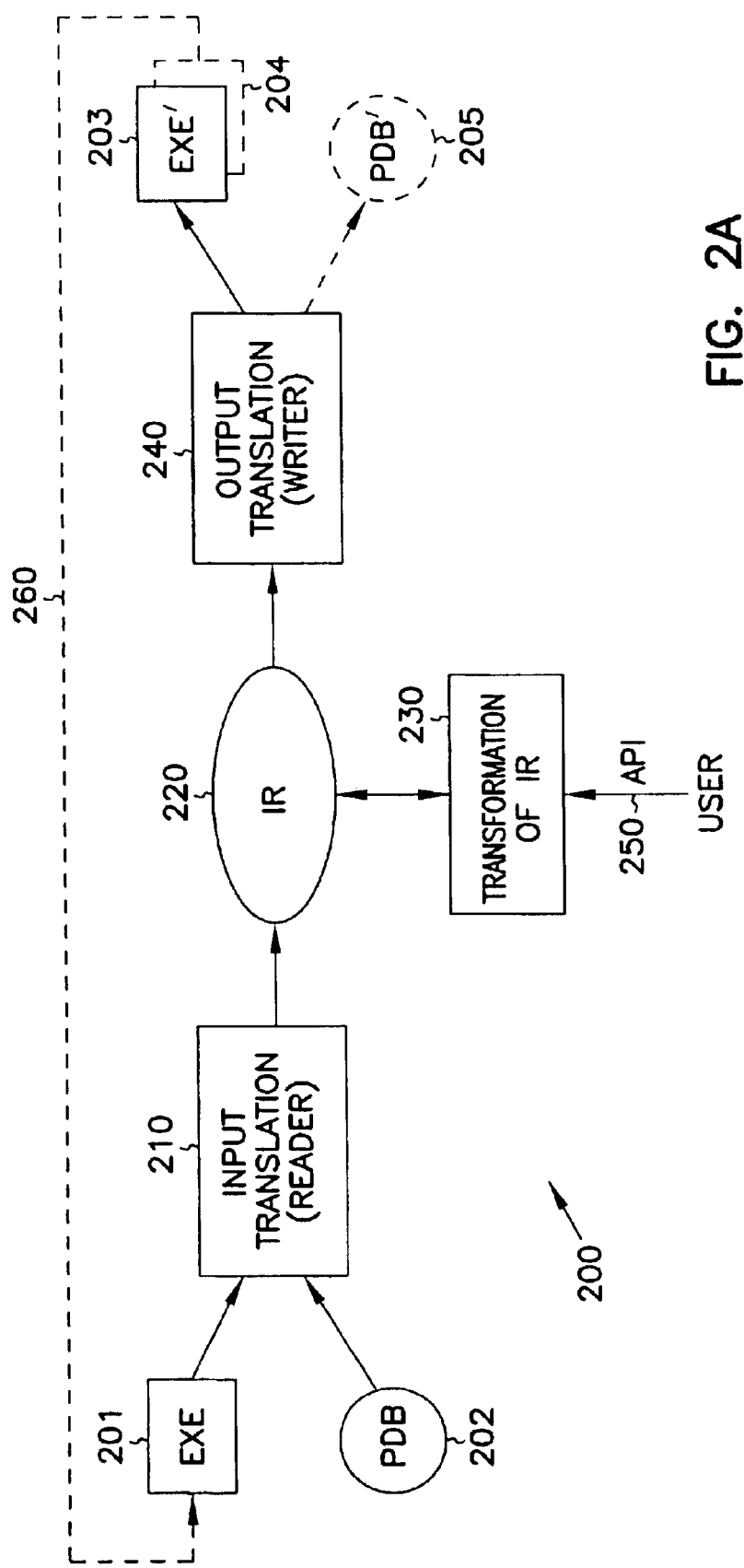
FIG. 2A is a diagram illustrating a system-level overview of an exemplary embodiment of the invention.

A system level overview of the operation of an exemplary embodiment of the invention is described by reference to FIGS. 2A–D. A heterogeneous program contains multiple executable components, such as main program code and shared libraries, written for different computer architectures (platforms) or programming languages. FIG. 2A shows a system 200 that translates and transforms components in a heterogeneous program. The system 200 comprises an input translator (reader) 210, a transformation module 230, and an output translator (writer) 240. All three modules work with a high-level abstraction of a heterogeneous program, referred to as an "intermediate representation" (IR) 220. The IR is a set of pseudo-instructions for a stack-based logical machine with an unlimited number of registers that represent the functionality of the heterogeneous program.

Figure 2B:
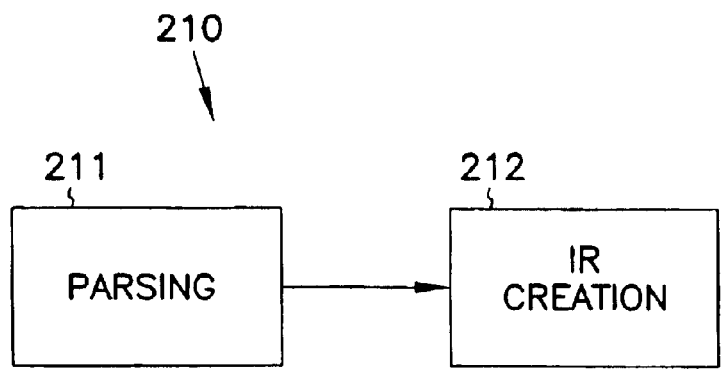
FIGS. 2B, 2C and 2D are diagrams illustrating additional details of the processes shown in FIG. 2A.
Figure 2C:
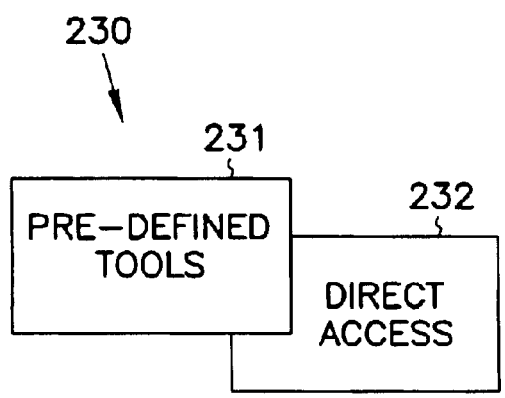

The reader 210 creates an IR 220 from an executable component (EXE) 201. The reader 210 is a two-stage process as shown in FIG. 2B. First, the executable 201 is parsed 211 into its basic blocks of code and data using information provided in a program database file (PDB) 202. As well-known in the art, a basic code block is defined as a code block having a single entry point and a single exit point. In an alternate embodiment, all the work performed by the parser 211 is input directly into the second stage of the reader 210, thus skipping the parsing process.

Once the code and data blocks are identified, an IR creation process 212 evaluates each platform-dependent instruction on a block-by-block basis. There are very large set of common instructions regardless of architecture, i.e., move, store, add, etc., that can be represented by a single platform-neutral IR instruction. For RISC (reduced instruction set computer) architectures, most, if not all, instructions can be easily translated into a single platform-neutral IR instruction. On the other hand, CISC (complex instruction set computer) architectures, such as the Intel x86 family, contain complex instructions that provide the function of multiple instructions. In one exemplary embodiment, the platform-dependent instructions that have a single platform-neutral IR instruction counterpart are translated into that platform-neutral instruction, while complex instructions are replicated as-is within the IR through an extended version of the basic IR instruction. A replicated complex instruction is marked with a signature that denotes its architecture. The output translator 240 recognizes a signed complex instruction and processes it as described further below. In an alternate embodiment, a complex instruction is represented by a set of platform-neutral IR instructions that perform the equivalent function.

Figure 3:
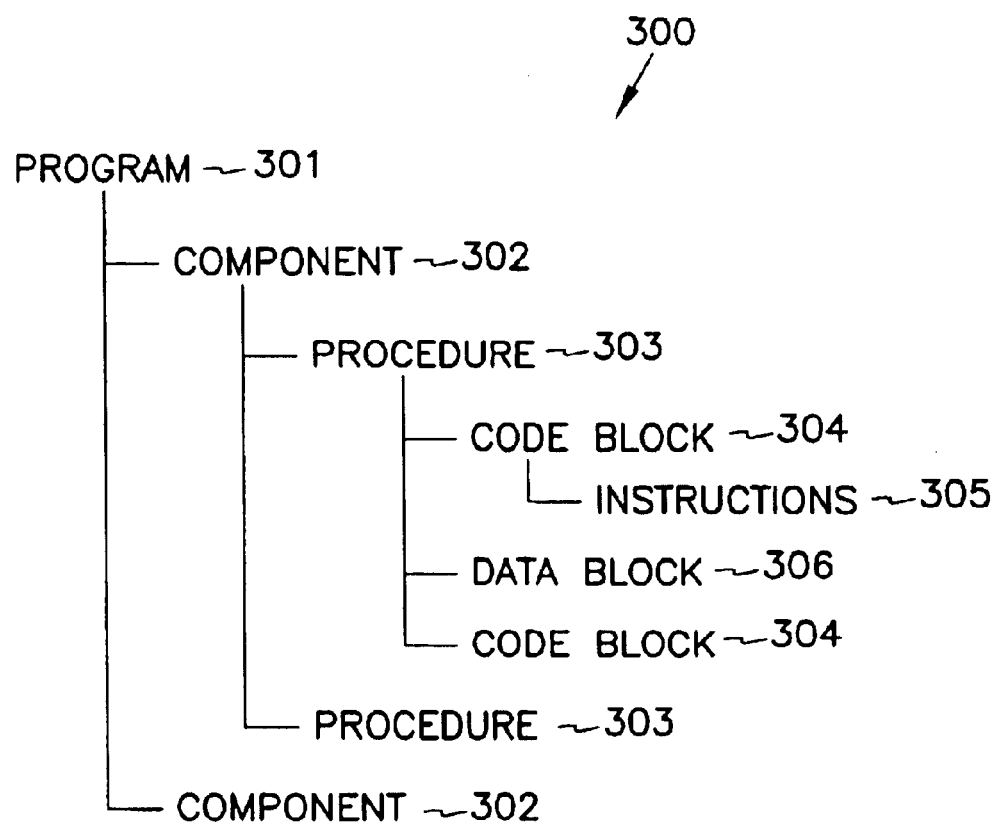
FIG. 3 is a diagram of an intermediate representation hierarchy used by the exemplary embodiment of FIG. 2A.

After the instructions in the code blocks have been translated, the IR creation process 212 creates a logical hierarchical view of the executable 201 as illustrated in FIG. 3. All architectures share the basic concepts of instructions 305, code blocks 304, data blocks 306, components 302, and procedures 303, so the IR hierarchy 300 enables the user to understand the structure of the intermediate representation of a heterogeneous program 301. The code blocks are logically connected as specified in the EXE file 201 so that the blocks can be more easily manipulated during the transformation process 230. Procedures are determined by following the logical connections using information provided in the PDB file 202. Procedures are collected together to create the program components. Little or no optimization of the program is performed by the creation process 212 since it is desirable that the intermediate representation be as close to what the programmer originally wrote as possible.

However, tracing the logical connections to determine the procedures can result in more procedures being created than originally coded by the programmer as described further below. Therefore, the creation process 212 annotates, or "decorates," the hierarchy 300 with the user names supplied in the symbol table for the EXE 201. The annotations enable the user to understand how the IR control flows and how the elements of the IR hierarchy correspond to the procedures and the components in the original code so the appropriate transformations can be applied to the IR. The annotations are maintained in data structures for the procedures during the transformation process and output by the output translator 240.

At the end of the creation of the IR hierarchy, all instructions are represented in the hierarchy as IR instructions within code blocks so that there is no differentiation between code written for one platform and code written for a second platform.

Once the intermediate representation is complete, the user is allowed to manipulate the code and data (illustrated by the IR transformation module 230) through an application program interface (API) 250. The exemplary embodiment of the system 200 provides some pre-defined tools 231 (FIG. 2C) used to instrument and optimize the IR that are guaranteed to be safe in that the tools will evaluate a change requested by the user and only manipulate the code in an appropriate manner. The API 250 also permits the user direct access 232 to the IR to navigate through the IR and to make changes, such as moving blocks between procedures, modifying blocks, rearranging the logical connections between blocks, and changing the platform-specific instruction set for a code block. The tools 231 are described in detail in the related "Instrumentation and Optimization Tool" patent application. The API 250 is described in detail in the related "Application Program Interface" patent application.

By instrumenting the IR using the tools 231, the user can now watch the interrelationship between the various components of a heterogeneous program and determine if a block of code contained in one component is heavily used by another component, and therefore that block of code should be moved out of the first component and placed into the second component to speed up execution. This process is described in detail in the related "Shared Library Optimization" patent application. Alternately, the user may decide to copy, instead of move, the code into the second component, a process referred to in the art as "code replication." A common optimization technique called "inlining" utilizes code replication.

Figure 2D:
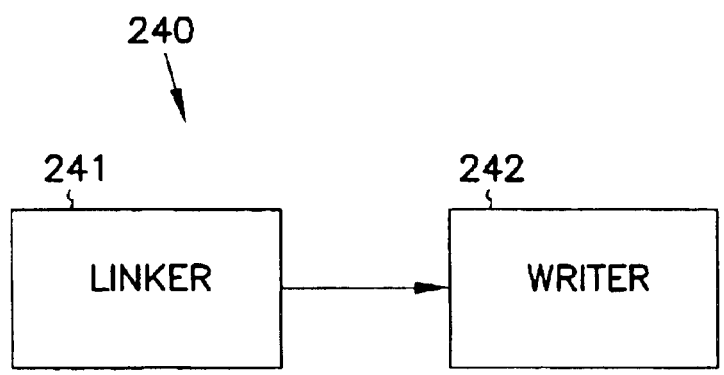

The transformed IR is now input into the output translator 240. The output translator 240 operates on the IR in two phases as shown in FIG. 2D: a linker phase 241 that resolves the logical connections into absolute addresses in an address space for a modified version of the executable, and a writer phase 242 that assembles the IR into the modified version of the executable (EXE') 203. The blocks in the executable 203 can be emitted by the writer 242 for their original platform, or can be emitted for a different platform.

The linker 241 must maintain the semantics of the code of the hierarchy when resolving the addresses, i.e., preserve the logical connections between blocks and the location of referenced data. The linker 241 determines the size of each code block based on the length of each instruction in the block. The linker 241 is also responsible for adding whenever prologue and epilogue code necessary to "glue" together contiguous blocks that will be assembled into different platform-dependent instructions. As part of the address resolution, the linker 241 also can perform limited code modification or optimization. For example, assume that prior to the transformation process 230, there was a jump between two code blocks, but those blocks are now contiguous. In this case, the linker 241 removes the now-unnecessary jump and lets the logic flow fall through to the second block. Because the hierarchy extends down to the instruction level and is consistent regardless of the manipulation performed by the user, the linker 241 has more knowledge of the placement of instructions than did the programmer. Thus, in architectures in which instructions have both a long and short form depending on the location they are addressing, the linker 241 chooses the appropriate instruction size, which can be a better choice than that originally made by the programmer.

The writer 242 assembles each IR instruction into its platform-dependent counterpart based on the architecture specified in the code block. In an exemplary embodiment in which complex instructions are replaced in the IR, if the complex instruction is being written to the same platform, the writer 242 merely emits the instruction. If the complex instruction is designated to be translated into a different architecture, the writer 242 creates the appropriate set of platform-specific instructions to perform the same function as the original, complex instruction.

As part of the EXE' 203, the writer 242 creates an emitted block information data structure containing the annotations created by the reader process 210 for each block in the executable. This allows the EXE' 203 to be iterated through the entire process 200 as many times as desired (represented by phantom arrow 260), while enabling the user to distinguish the original procedures from those added in a previous iteration as described further below. In an alternate embodiment, the emitted block information is combined with the PDB file 202 to create a new version of the program database file (PDB') 205 (shown in phantom). The output translation process 240 is described in detail in the related "Cross Module Representation" patent application.

In an alternate exemplary embodiment of the translation and transformation system 200 not illustrated, the IR containing the absolute addresses assigned by the linker 241 is used as input into the IR creation process 212 for further iteration through the system 200. One of skill in the art will immediately appreciate that much of the work performed by the creation process 212 as described above can be skipped when iterating the modified IR through the system 200. This embodiment allows the user to transform a heterogeneous program in stages rather than having to make all the changes in a single pass through the system 200.

The system level overview of the operation of an exemplary embodiment of the invention has been described in this section of the detailed description. A translation and transformation system translates a binary component into an intermediate representation, provides an application program interface through which a user can transform the intermediate representation, and translates the intermediate representation as transformed by the user into a modified version of the binary. While the invention is not limited to any particular arrangement of modules, for sake of clarity exemplary set of modules has been described. One of skill in the art will readily recognize that the functions attributed to the modules described in this section can be assigned to different modules without exceeding the scope of the invention. Furthermore, although the translation and transformation of only one input component (EXE 201) has been illustrated and described above, the system can take multiple components, and accompanying PDB files, as input.

Methods of Exemplary Embodiments of the Invention

Figure 4A:
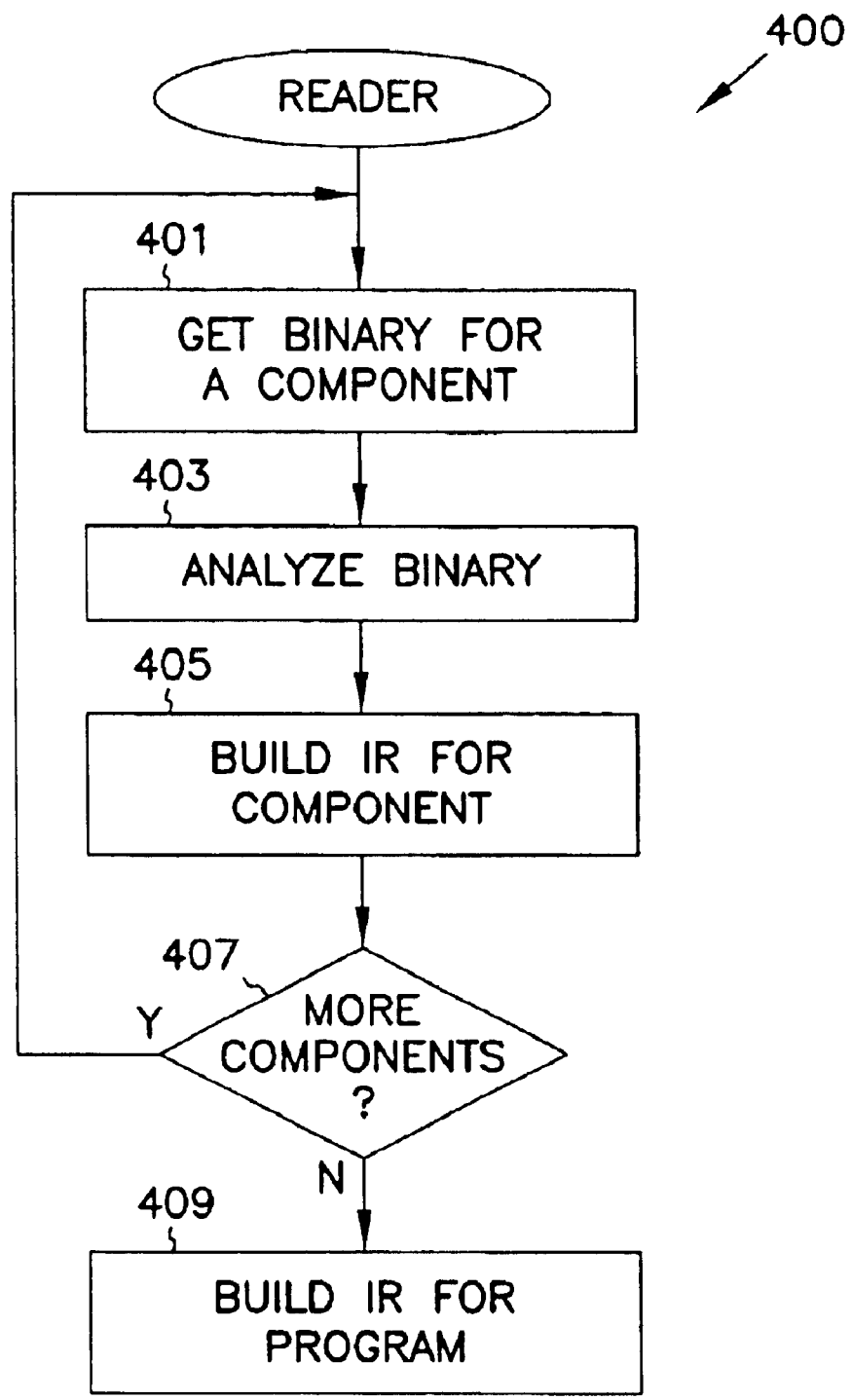
FIG. 4A is a flowchart of a reader method to be performed by a computer according to an exemplary embodiment of the invention.
Figure 4B:
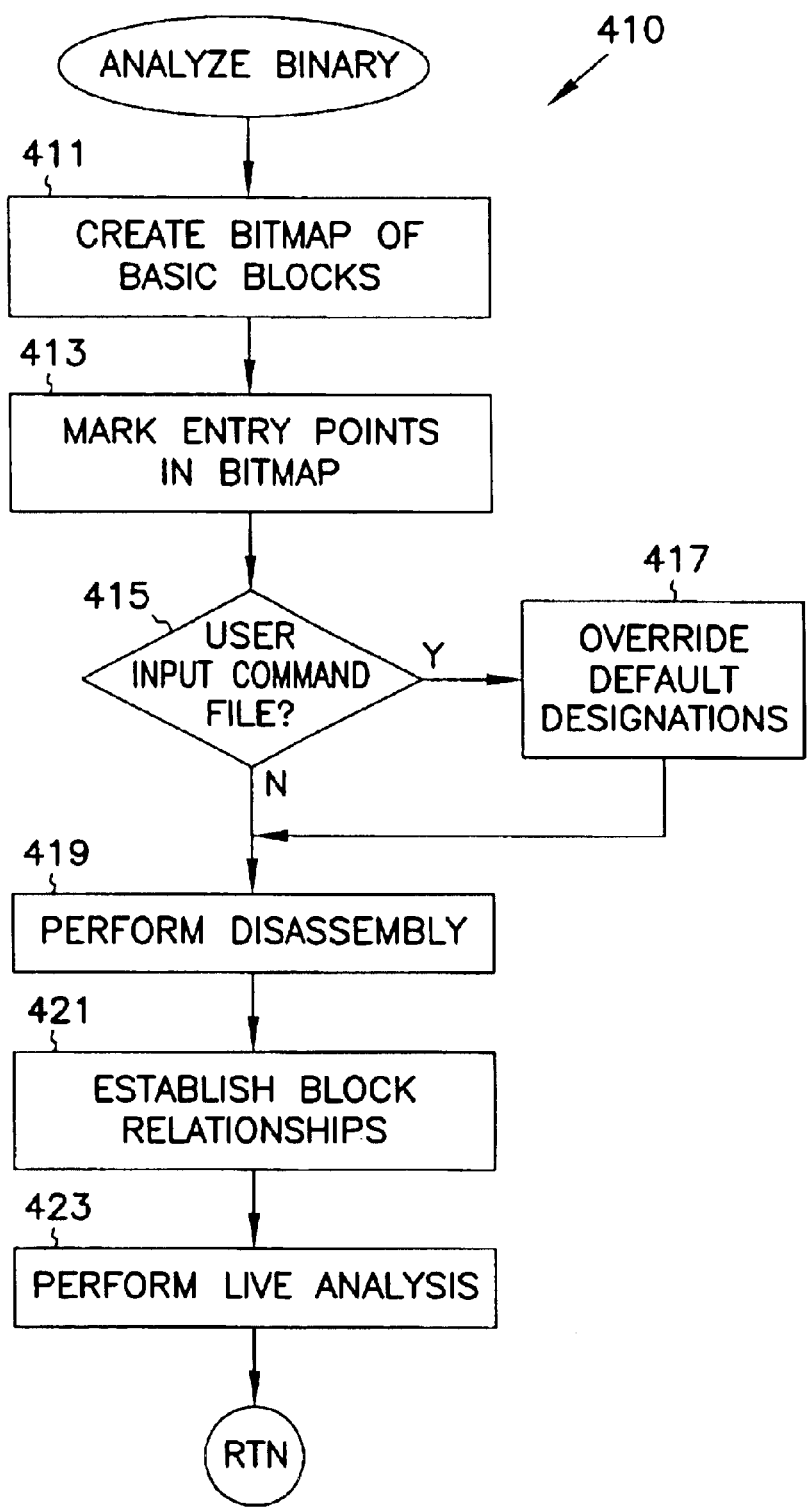
FIGS. 4B and 4C are flowcharts of details of the exemplary embodiment of the reader method of FIG. 4A.
Figure 4C:
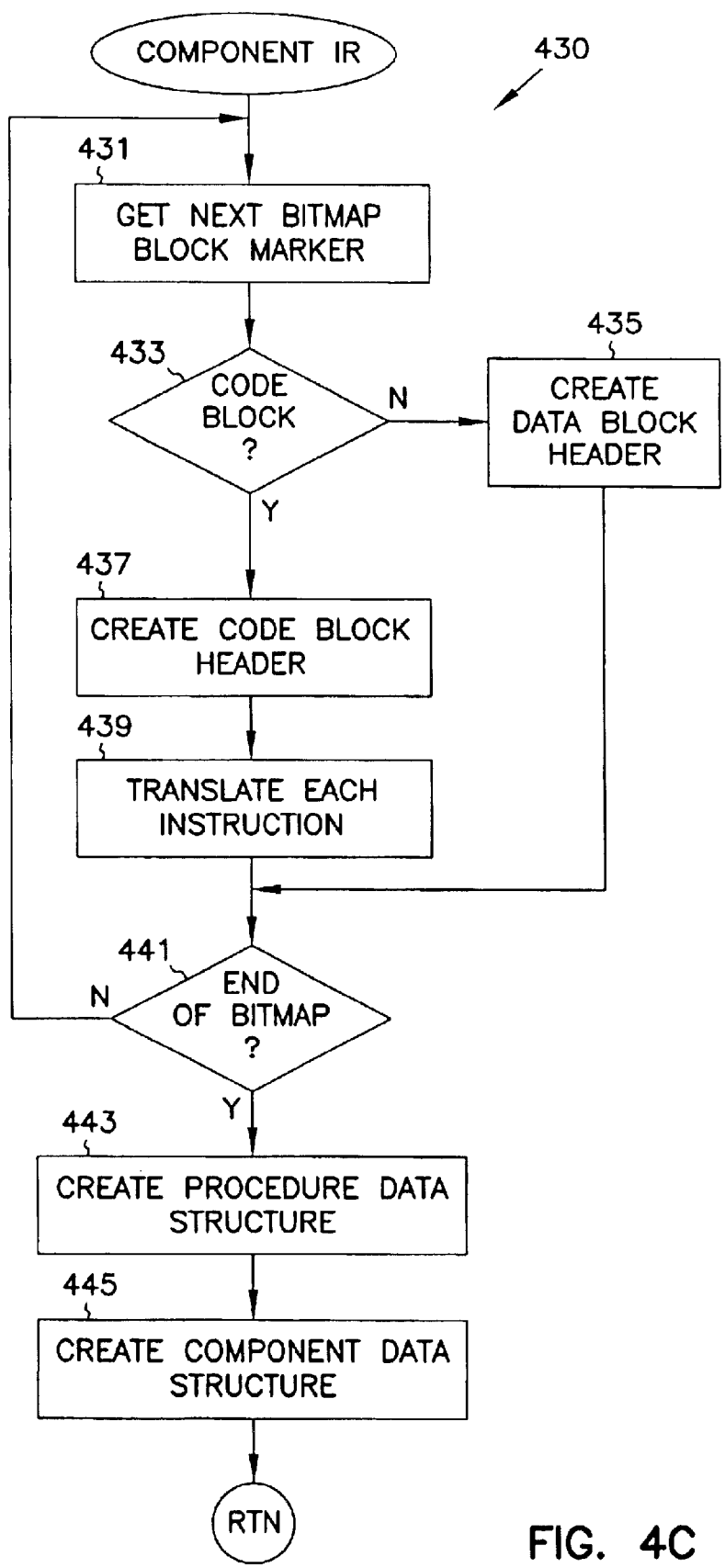

In the previous section, a system level overview of the operations of exemplary embodiments of the invention was described. In this section, the particular methods performed by a computer executing such exemplary embodiments are described by reference to a series of flowcharts. The methods to be performed constitute computer programs made up of computer-executable instructions. Describing the methods by reference to a flowchart enables one skilled in the art to develop such programs including such instructions to carry out the methods on a suitable computer (the processor of the computer executing the instructions from computer-readable media). FIGS. 4A–C illustrate the acts to be performed by a computer executing a reader method that encompasses the input translation process 210 shown in FIGS. 2A and 2B. A heterogeneous program contains at least one component, shown in FIG. 2A as EXE 201. The reader method 400 takes each component at a time and translates the platform-specific instructions in the component into IR instructions as shown in FIG. 4A. An analysis process at block 403 corresponds to the parsing process 211 in FIG. 2B and is illustrated in more detail in FIG. 4B. An IR creation process at block 405 corresponding to the IR creation process 212 in FIG. 2B, is illustrated in more detail in FIG. 4C.

The binary for a component is obtained (block 401) and analyzed (block 403). The process of analyzing a binary to discern its code blocks and data blocks is often referred to as "code discovery." An exemplary embodiment of a code discovery operation 410 illustrated in FIG. 4B is described with reference to the methodology disclosed in U.S. Pat. No. 5,664,191, assigned to the assignee of the present application. Various other code discovery methodologies are currently in use in the art and could be easily substituted by one of skill in the art in block 403.

In the exemplary embodiment, the PDB file 202 is assumed to contain entry points, export entry tables, jump tables, and symbol tables. A first approximation of the basic blocks is created at block 411 using the locations of procedures, labels, and data as deed in the PDB file 202. A bit map of the binary is created in which each bit represents an address in the binary. The beginning address of each block is marked in the bit map as either a code block or a data block. All entry points listed in the PDB file 202 are next marked in the bit map (block 413). The entry points are assumed to mark the beginning of a code block. At this point in the process, the length of a block is assumed to extend from its beginning mark in the bit map until another mark is encountered. However, a block marked as data can contain code that does not have an entry point. Because the component's creator knows where the various blocks begin and end, the process checks to see if a user input command file was provided (block 415) and uses it, if available, to override any default designation of a code block as data (block 417).

A disassembly process (block 419) creates an unprocessed bit map from the current bit map of the binary. All addresses marked as the beginning of either a code block or data block in the bit map of the binary are marked as used in the unprocessed bit map. The jump table is processed and each address in it is marked as the start of a procedure in the unprocessed bit map. The disassembly process analyzes the export entry tables and marks any address found. For each unmarked address in the unprocessed bit map, the corresponding binary location is examined to determine if it is an instruction that it either transfers control to another block (thus defining the end of one code block and potentially the beginning of another) or begins a "follower" block (a code blocks that does not have a direct entry point and is not jumped to from within the component, but is entered by "falling through" from a previous block). A code block that ends in a return is marked as the end of a procedure. Any code blocks which remain unmarked on the unprocessed map at the end of the disassembly process are considered "dead code" in that there is no way to access the block. Dead code blocks are marked in the binary bit map for deletion.

The relationships among the blocks are established using the symbol table information (block 421). The relationship data for each instruction consists of the addresses of the source and target blocks, the type of the instruction, and any displacement in the target block.

The code discovery process concludes by performing live analysis on the binary (block 423). A live bit map is created from the binary bit map. Starting at the first entry point in the PDB file 202, the process traces the logical control flow thought the binary, marking each address referenced. After all the entry points have been traced, the process examines each unmarked address to determine if it is a "taken" address, an address that can be invoked without a direct call. All taken addresses are marked in the live bit map. Finally, the procedures as defined in the PDB file 202 are traced. Any unmarked addresses in the live bit map that are within code blocks are marked in the binary bit map for deletion. Note that constants that are in code, such as "move constant into a register," actually remain within the code block. Only binary information that will be referred to by an address field within the IR (such as a data structure that will be loaded into memory when the program is executed) is placed in a data block.

Returning now to FIG. 4A, after the analysis is completed and the binary bit map created at block 403, the reader method builds the IR for the component from the binary bit map at block 405. An IR build method 430 is illustrated FIG. 4C.

Figure 5A:
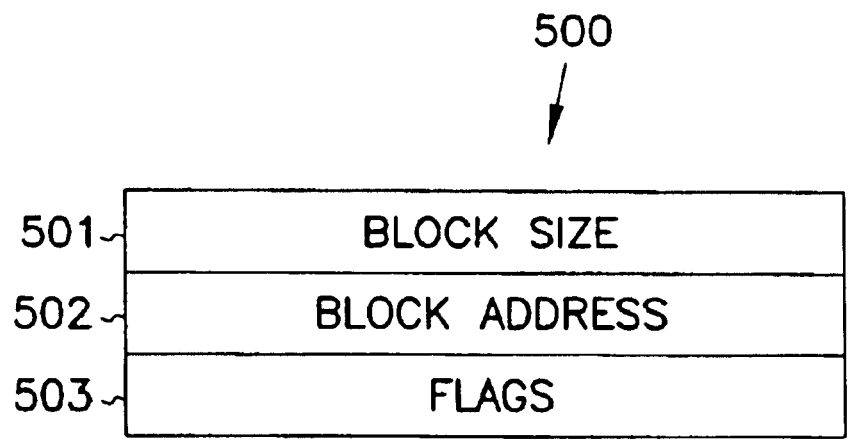
FIGS. 5A and 5B are diagrams of a block data structure created by the reader method of FIG. 4A.

Each block marker in the bit map is examined, in order, (block 431) to determine if it defines the start of a data block or a code block (block 433). An appropriate header is created (block 435 or block 437). One exemplary embodiment of a header 500 is shown in FIG. 5A, consisting of a block size field 501, a block address field 502, and a set of flags 503. The block address field 502 is the original address for the block within the component. Table 1 defines the flags 503 for the present exemplary embodiment of the header.

TABLE 1

| Flag | Block Type | Description |
| --- | --- | --- |
| IsData | Code or Data | defines block as code or data |
| IsCallTarget | Code | whether block contains an entry point for a procedure |
| IsInstrumentable | Code | whether block can have instrumentation added by user |
| IsUnreachable | Code or Data | whether block can be reached from another block in the binary |
| IsNoReturn | Code | whether block transfers control and does not return to calling block |
| Alignment | Code or Data | boundary on which to align the block, if any |
| Assembler | Code | code architecture |

Figure 5B:
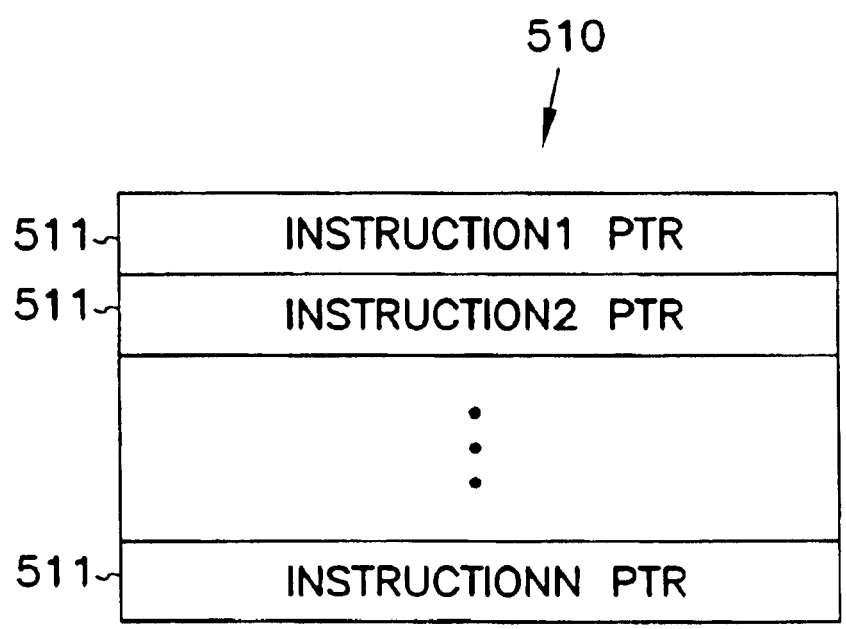

Each (non-deleted) instruction in a code block is translated into its corresponding IR instruction (block 439). Each IR instruction is represented in memory as a data structure. An exemplary embodiment of a data structure for an IR instruction is described in the next section in conjunction with FIG. 9. The IR for a code block comprises the code block header 500 and a list 510 of pointers to the in-memory data structures for its neutral-platform instructions 511 (referring to FIG. 5B).

In one exemplary embodiment, if the same instruction occurs more than once in a code block, each of the corresponding pointers in the list 510 points to the same neutral-platform instruction. The opcode and operands for each instruction are passed through a hashing algorithm. The corresponding hash table entry is examined to determine if it is associated with an existing instruction data structure, i.e., the new instruction duplicates an existing one. The pointer to the existing instruction data structure is stored in list 510 for duplicate instructions. Representing duplicated instructions in this fashion reduces the memory "footprint" of the IR since statistical analysis has shown that, on average, only about 30% of the instructions for a component are unique.

Note that the binary is translated by walking through it block by block, and not instruction by instruction, because the lowest level granularity of interrelationships is between code blocks, not between code instructions.

Figure 6:
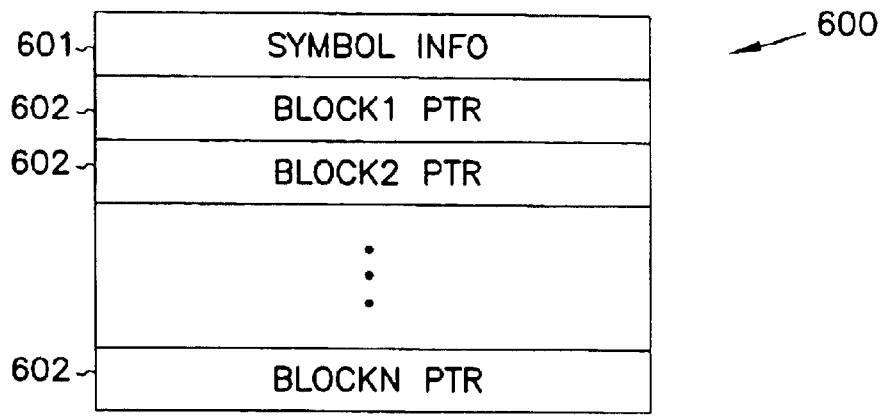
FIG. 6 is a diagram of a procedure data structure created by the reader method of FIG. 4A.

When the end of the bit map is reached (block 441), all instructions have been translated into IR instructions and all data and code blocks have been represented within the IR. At block 443, information for each procedure in the component is extracted from the symbol table. The starting address and length of the procedure is used to determine which data and code blocks belong to the procedure; a pointer 602 to each of those blocks is stored in a procedure data structure 600 (referring to FIG. 6). Note that as a result of the disassembly step 419, there can be more procedures in the component than are described by the symbol table but these are identified by the "IsCallTarget" flag in the code block header 500. The symbolic names associated with the procedure in the original binary are now mapped into the procedure data structure as symbol information 601 to decorate the IR. Therefore, if an instruction within a code block is addressing another portion of the IR, either another instruction within a code block or data within a data block, the symbol information 601 associates that instruction with the instruction or data that it is pointing to. An alternate embodiment of the process at block 443 handles situations in which the program has been optimized by a different utility so that code blocks for a procedure no longer appear contiguously in the binary. Such an alternate embodiment relies on "mapping" data in the symbol table to determine the new addresses for the code blocks that have been moved out of the contiguous range so the procedure will consist of the correct blocks.

Figure 7:
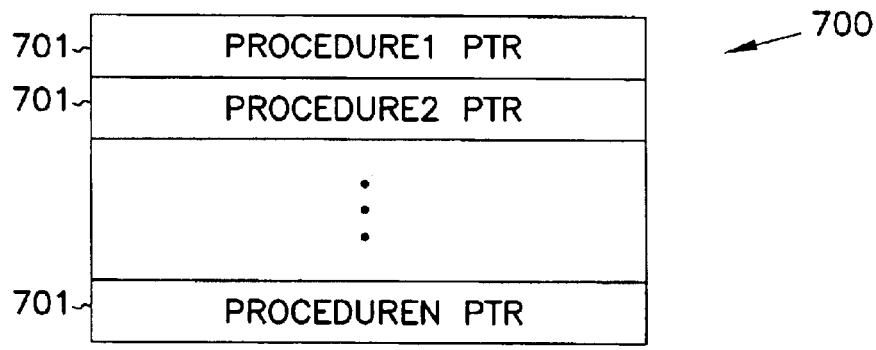
FIG. 7 is a diagram of a component data structure created by the reader method of FIG. 4A.

A component data structure 700 (referring to FIG. 7) is created that contains a pointer 701 to each procedure data structure 600 in the component (block 445).

Figure 8:
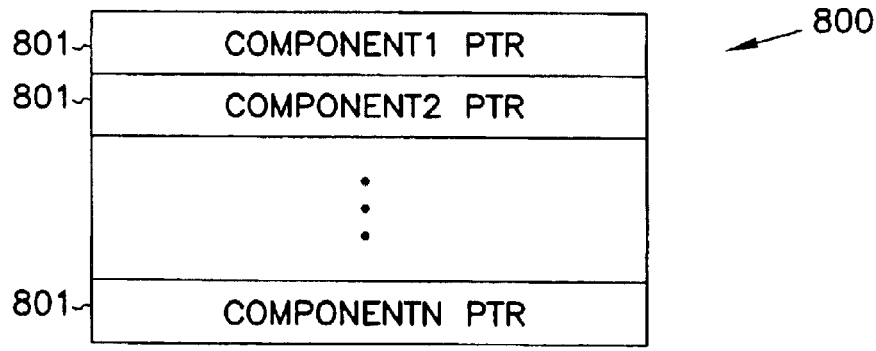
FIG. 8 is a diagram of a program data structure created by the reader method of FIG. 4A.

Returning finally to FIG. 4A, the reader process determines if there are more components to be translated (block 407) and obtains the next executable 201 in the program for processing if necessary. Once an IR has been built for each component in the program, the reader process combines the component IRs to complete the program IR hierarchy (block 409). Referring to FIG. 8, the program IR is logically represented by a program data structure 800 that contains a pointer 801 to each component data structure 700.

When the EXE 201 has been iterated at least once through the system 200 in FIG. 2 so that the emitted block information 204 is present as part of the binary for the component or as part of the PDB file 202, the processing by the reader method 400 is simplified. In such a case, the reader method does not need to perform code discovery (block 401 and FIG. 4A) or create a bitmap because the emitted block information 204 contains the data from code and data block headers created in the previous iteration. Additionally, all dead code blocks have been deleted in the previous iteration and any inserted code blocks are so marked in the corresponding block header information.

In building the component IR (block 405 and FIG. 4C), the reader method creates the IR block headers from the emitted block information at blocks 435 and 437. Each instruction in each code block is translated into an IR instruction at block 439 as previously described. The processing at blocks 431 and 441 use the emitted block information 204 instead of the bitmap. The processing represented by block 443 employs the symbol data stored in the emitted block information 204 to create the procedure data structure and decorate the IR. IR component data structures are then created from the IR procedure data structures at block 445 as previously described.

The particular methods performed by computer in executing an exemplary embodiment of the reader process 210 have been described with reference to flowcharts including all the acts from 401 until 409, 411 until 423, and 431 until 445. In addition, exemplary embodiments of data structures employed by the reader process 210 have been illustrated, including logical data structures that define the code and data blocks, procedure, components, and programs in the IR hierarchy.

Intermediate Representation Instructions

Figure 9:
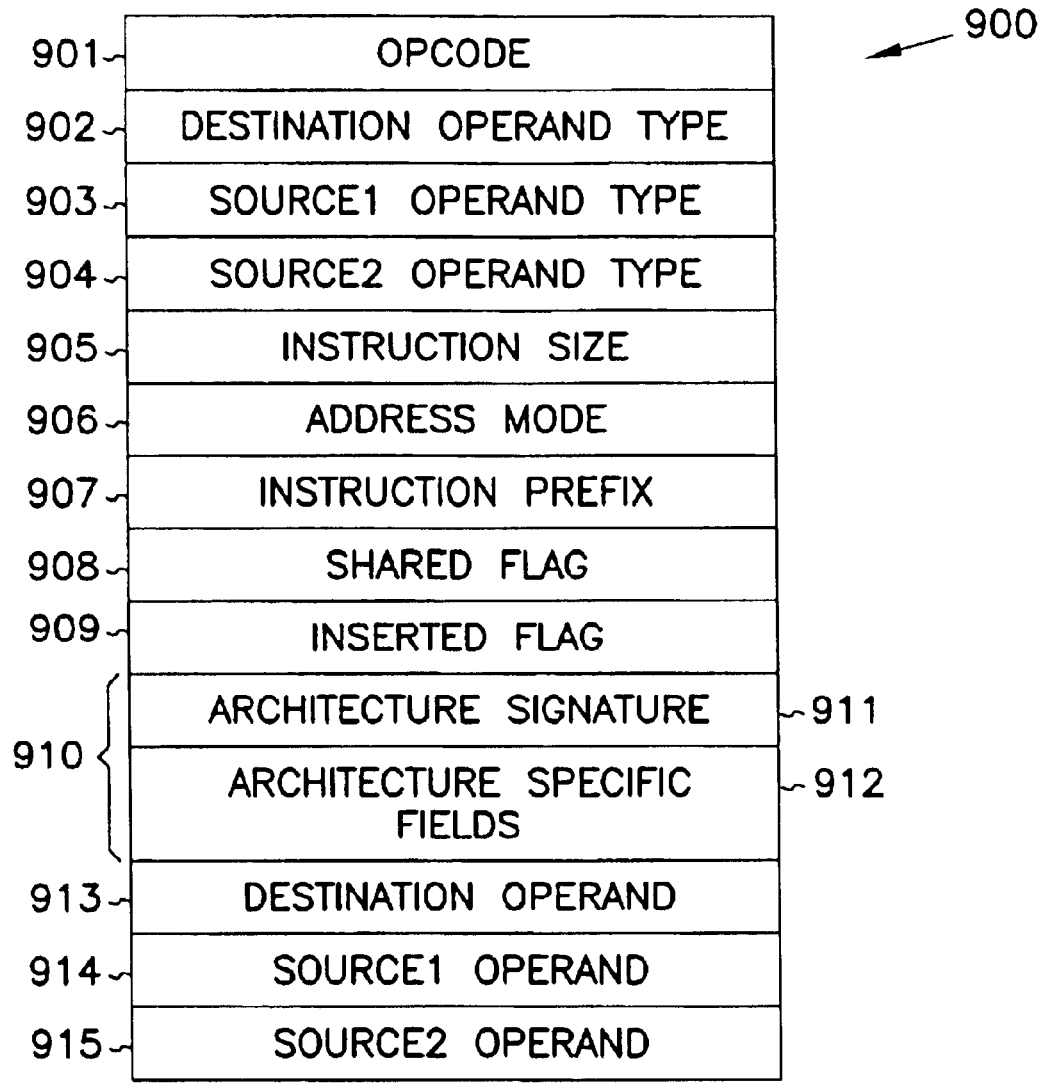
FIG. 9 is a diagram of an IR instruction data structure created by the reader method of FIG. 4A.

One exemplary embodiment of a data structure 900 for an IR instruction is illustrated in FIG. 9 as having an opcode 901 and three operands, a destination 913 and two sources 914, 915 in its basic version. The majority of instructions for the majority of current computer architectures can be represented by this basic format. Each operand is also associated with a type field 902, 903, 904, which is used by the linker 241 in resolving the addresses. The operand types covered by the basic version of the exemplary IR instruction are listed in Table 2 using standard C++ terminology.

TABLE 2

| Type | Description |
| --- | --- |
| long | regular memory address |
| Eregister | register |
| EStack | stack location |
| UCHAR* | pointer to character data |

The size of the instruction 905 and the address mode 906 of the instruction is also stored in the data structure 900. An instruction prefix field 907 is available to store such information for those architectures that require it. Two flags indicate whether the instruction is shared 908, i.e., more than one instruction pointer points to the data structure 900, and whether the instruction is inserted 909, i.e., not part of the original instruction set, as when a user inserts code during the transformation process 230 in FIG. 2A.

When present, an optional architecture specific section 910 in the data structure 900 creates an extended version of the IR instruction to handle complex platform-dependent instructions that do not fit into the basic format. The architecture specific section 910 contains an architecture signature 911 described previously, and any additional fields 912 necessary to replicate the complex instruction in the IR. The use of the expanded version of the instruction data structure is most easily understood through an example.

Assuming the complex instruction is part of the Intel IA-64 (Merced) instruction set, the architecture specific fields 912 are shown in Table 3 with additional complex operand types for the Intel IA-32 platform shown in Table 4.

TABLE 3

| Field Name | Size |
| --- | --- |
| qualifyingPredicate | 7 bits |
| IA-64Completers | 5 bits |
| IA-64Sylable | 2 bits |
| IA-64CycleBreak | 1 bit |

TABLE 4

| Type | Description |
| --- | --- |
| CAddress* | indirect addressing mode |
| CBBlock* | operand is another basic block |
| CGenAddress* | direct addressing mode |
| COperandOverflow* | 4+ operands |

The following C++ data structure enables a general addressing scheme that provides for the building of complex Intel IA-32 instructions in which at least one of the operands is a pointer to a memory location at address "symbol+base+index*scale+offset":

```
class CAddress : public VAddress, public CMemManager<CAddress>
{
private:
    UAddressBase      m_addressBase;
    AddrDisp          m_displacement;
    UCHAR             m_baseReg;  // REGISTER coded
    UCHAR             m_indexReg; // REGISTER coded
    USHORT            m_dispType:3;
    USHORT            m_addressBaseType:2;
    USHORT            m_scale:2;
    USHORT            m_unused:1;
};
```

For example, in the Intel IA-32 instruction
   MOV EAX,[ESI*4+100000h]
the operand [ESI*4+100000h] is a CAddress type operand and is represented in the IR by an instance of the CAddress data structure where:
   m_indexReg=ESI
   m_scale=4 and
   m_displacement=100000h.

The field "AddrDisp" is further redefined as an operand of the long, CBBlock* or CGenAddress* type. An operand of the CGenAddress type also is a C++ data structure:

```
class CGenAddress : public CMemManager<CGenAddress>
{
private:
    CBBlock*                  m_pBBlock;
    union
    {
        int     m_imm;  //Long
        CInst*  m_pInst;
    };
    FIXUPT                    m_fixupt;
};
```

A typical use of a CGenAddress type of operand is described in conjunction with an example instruction:
   MOV EAX, Offset BasicBlockA
that references the address of a block. This example illustrates the direct addressing mode, in contrast with CAddress operands which use indirect addressing mode (where the operand is the data pointed to by the computed address instead of the computed address itself). In this example:
   m_pBBlock=BasicBlockA
   m_imm=0
   m_fixupt=fixuptPointer32
The design of CGenAddress and CAddress also enables the representation of an instruction in which the pointer to a basic block is part of the computation of the addressing mode. For example:
   MOV EAX, [ESI*8+Offset BasicBlockA]

In this example, the operand [ESI*8+Offset BasicBlockA] is a CAddress type operand having a CGenAddress object, "Offset BasicBlockA," as part of its representation. The following is a breakdown of the [ESI*8+Offset BasicBlockA] operand:

m_indexReg=ESI m_scale=8 and m_displacement=CGenAddress object (where m_pBBlock=BasicBlockA).

Conclusion

A translation and transformation process and system that operates on heterogeneous programs has been described. An intermediate representation of the program provides a uniform abstract view of both homogeneous and heterogeneous components, thus allowing a single architecture-independent transformation to work on all component types. Because the architecture specific details are removed in the intermediate representation, the present invention enables whole program optimization across what were previously incompatible boundaries between components in a heterogeneous program. Moreover, code blocks within components can be translated into different architectures to enable faster execution of the program.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the translation to and from the IR instructions can be accomplished through the use of look-up tables, hashing function, or database records. Furthermore, those of ordinary skill within the art will appreciate that the IR hierarchy and the methodologies that operate on it are extendable to any computer architecture that relies on registers.

The terminology used in this application with respect to is meant to include all of these architectural environments. Therefore, it is manifestly intended that this invention be limited only by the following claims and equivalents thereof.

We claim:

1. A computer-readable medium having stored thereon an intermediate representation instruction data structure representing a platform-neutral instruction translated from a platform-dependent instruction in a heterogeneous program, the intermediate representation instruction accessible by a computer for manipulation and transformation to a platform-specific instruction executable by the computer, the data structure comprising:

an opcode field containing data representing an opcode for the intermediate representation instruction;

a destination operand field containing data representing a destination operand for the opcode identified by the opcode field;

a first source operand field containing data representing a first source operand for the opcode identified by the opcode field;

a second source operand field containing data representing a second source operand for the opcode identified by the opcode field;

a size field containing data representing a length for the instruction identified by a combination of the opcode field, the destination operand field, the first source operand field and the second source operand field;

a mode field containing data representing an addressing mode for the instruction identified by the combination.

2. The computer-readable medium of claim 1, further comprising:

a shared field containing data representing a flag that indicates the instruction identified by the combination occurs multiple times in a binary.

3. The computer-readable medium of claim 1, further comprising:

an inserted field containing data representing a flag that indicates the instruction identified by the combination was inserted into a binary as a result of user action.

4. The computer-readable medium of claim 1, further comprising:

a destination operand type field containing data representing a type for the destination operand identified by the destination operand field;

a first source operand type field containing data representing a type for the first source operand identified by the first source operand field; and a second source operand type field containing data representing a type for the second source operand identified by the second sourced operand field.

5. The computer-readable medium of claim 1, further comprising:

a signature field containing data representing a particular architecture when the instruction identified by the combination is a complex instruction.

6. The computer-readable medium of claim 5, further comprising:

at least one architecture specific field containing data representing additional information contained in the complex instruction identified by the combination.

7. A computer-readable medium having stored thereon a hierarchical data structure for an intermediate representation of a heterogeneous program, intermediate representation instructions of the heterogeneous program representing a platform-neutral instruction translated from a platform-dependent instruction in the heterogeneous program, the intermediate representation instruction accessible by a computer for manipulation and transformation to a platform-specific instruction executable by the computer, the hierarchical data structure comprising:

a component data structure for a component in the heterogeneous program, the component data structure comprising a procedure field containing data representing a pointer to a procedure data structure for a procedure in the component;

the procedure data structure comprising a first block field containing data representing a pointer to a code block data structure for a code block in the procedure identified by the procedure field; and an instruction data structure comprising an instruction field containing data representing a pointer to a instruction data structure for an instruction in the code block identified by the first block field.

8. The computer-readable medium of claim 7, wherein the procedure data structure further comprises a symbol field containing data representing symbol table information for the procedure identified by the procedure field.

9. The computer-readable medium of claim 7, wherein the code block data structure comprises a header field in each of a plurality of intermediate representation code blocks, the header field containing structure information for the block identified by the first block field.

10. The computer-readable medium of claim 9, wherein the structure information comprises:
   a size;
   an address; and
   a set of information flags.

11. The computer-readable medium of claim 7, further comprising:
   a program data structure for the heterogeneous program, the program data structure comprising a component field containing data representing the component.

* * * * *